(No Model.) 8 Sheets—Sheet 1.

W. M. MORGAN.
ELEVATED RAILWAY.

No. 419,594. Patented Jan. 14, 1890.

Witnesses
S. L. C. Hassom
Stuart Cardner

Inventor
Waitman M. Morgan
By Rich't H. Manning Atty.

N. PETERS, Photo-Lithographer, Washington, D. C.

(No Model.) 8 Sheets—Sheet 4.

W. M. MORGAN.
ELEVATED RAILWAY.

No. 419,594. Patented Jan. 14, 1890.

Witnesses Inventor

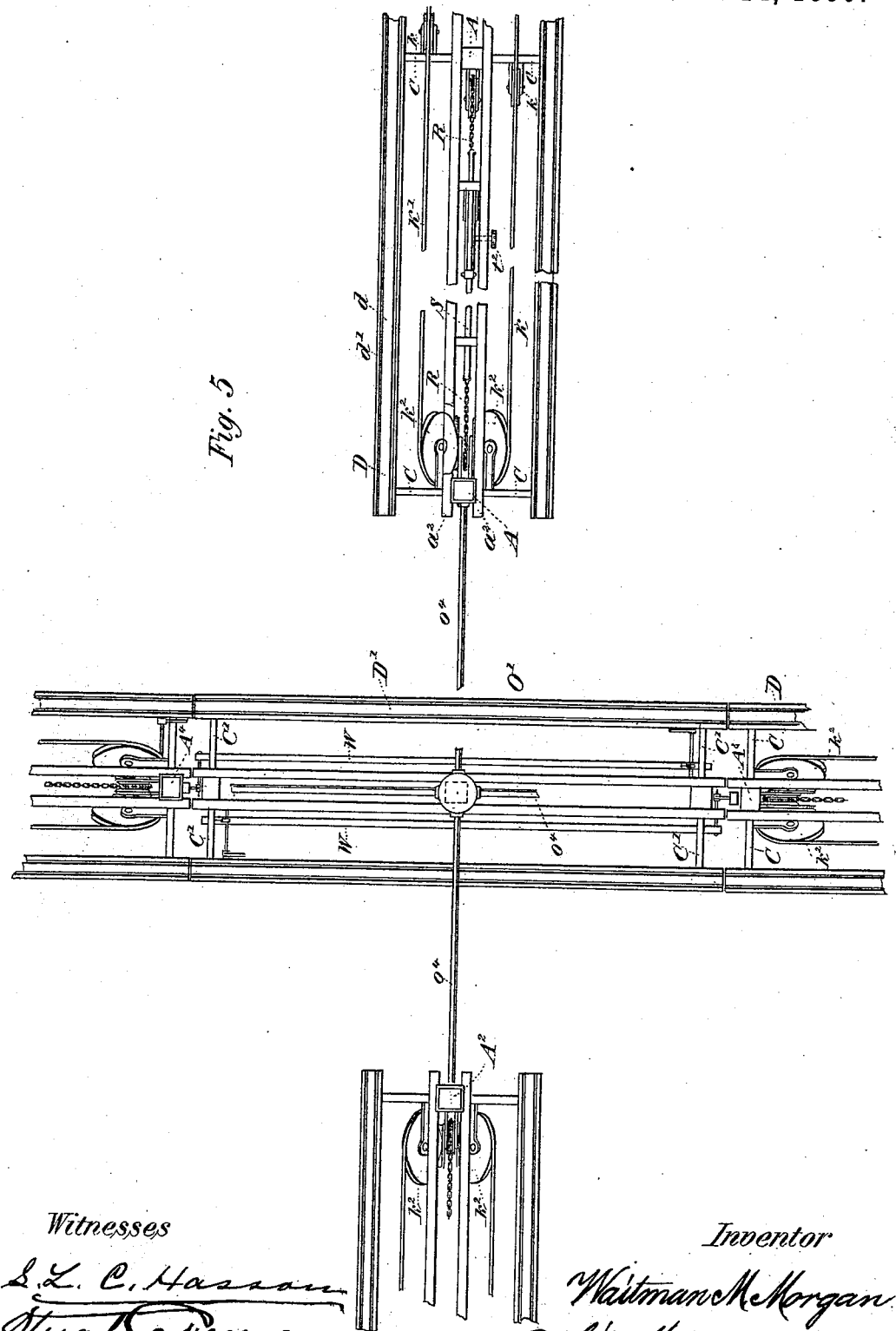

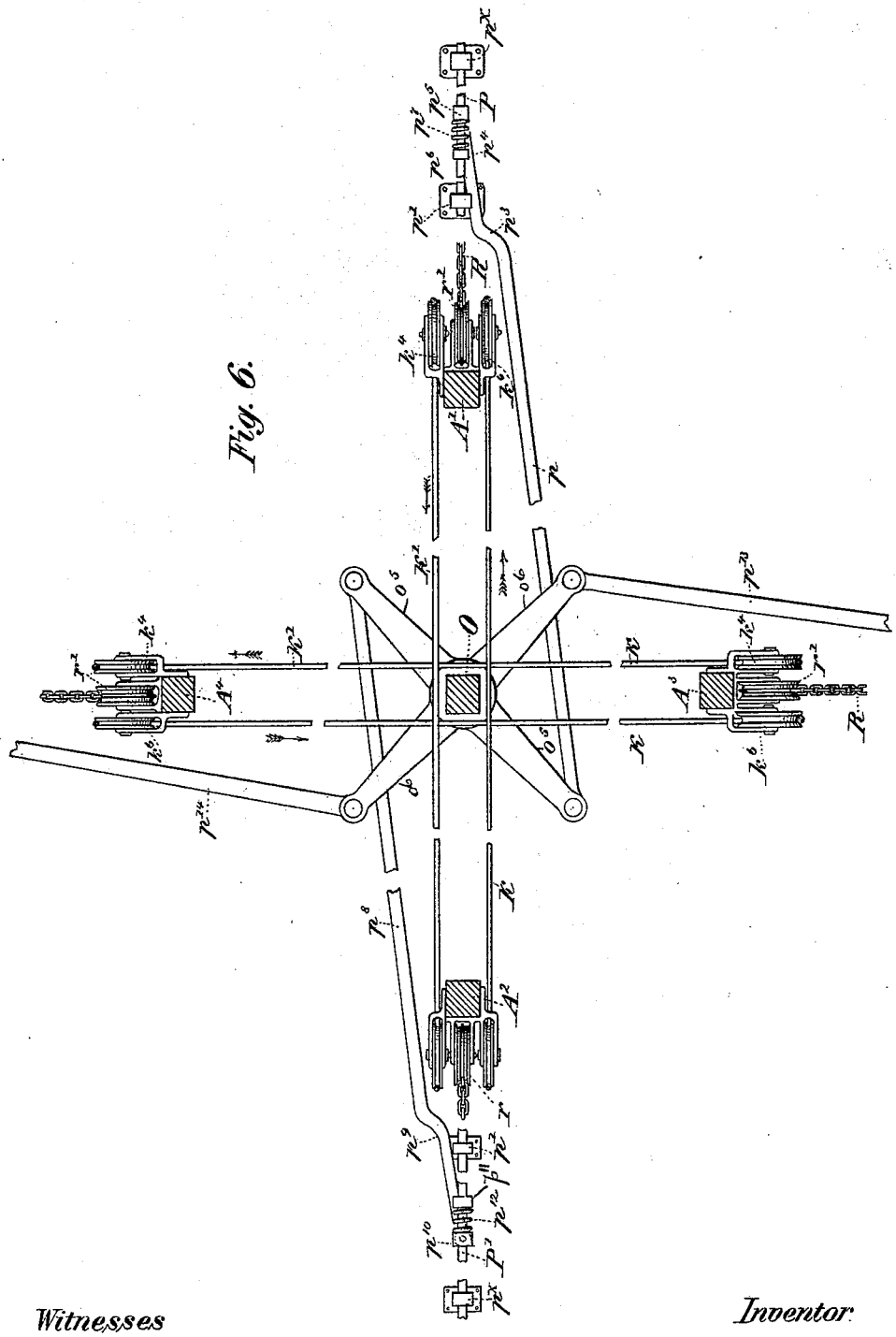

(No Model.) 8 Sheets—Sheet 7.
W. M. MORGAN.
ELEVATED RAILWAY.
No. 419,594. Patented Jan. 14, 1890.
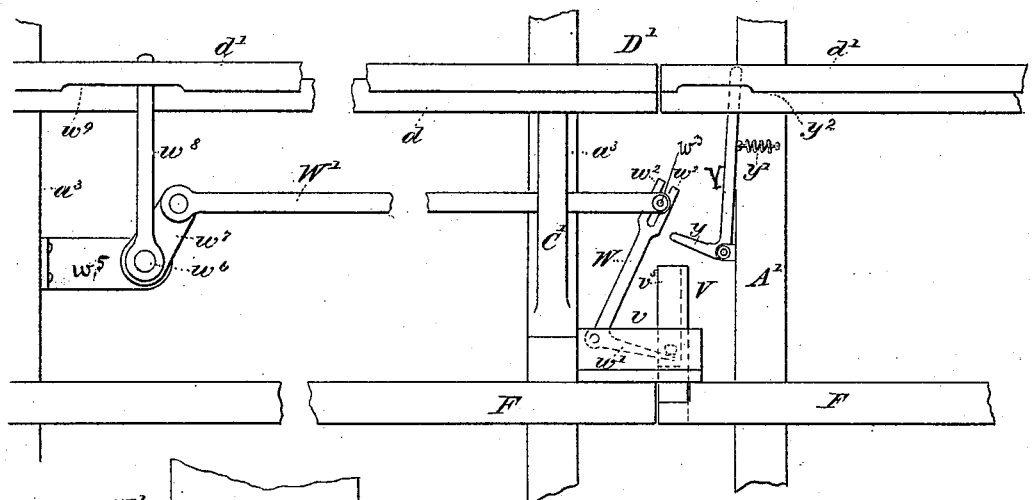
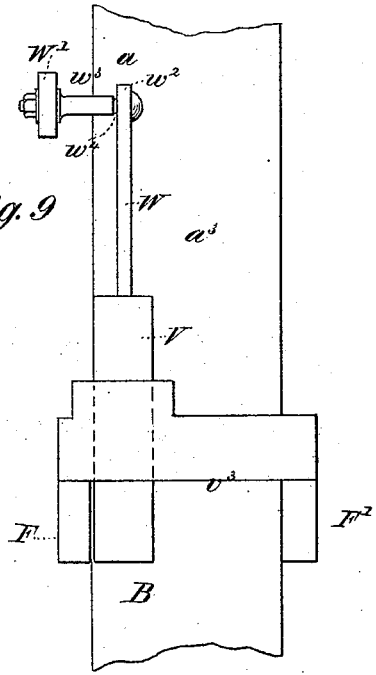
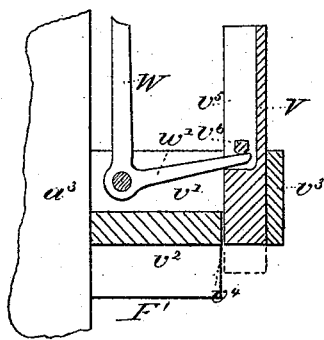
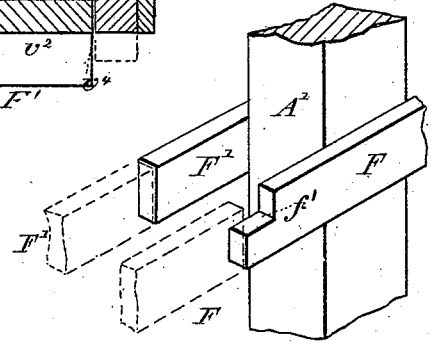
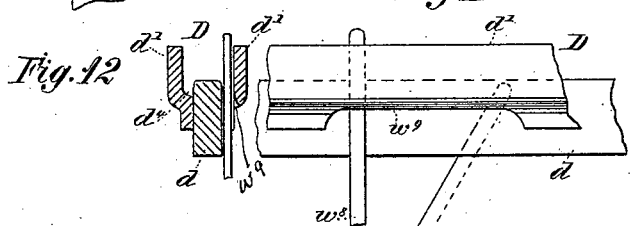
Witnesses
S. L. C. Hasson
Stuart Corkerer
Inventor
Waitman M. Morgan
By Rich'd K. Manning Atty
N. PETERS, Photo-Lithographer, Washington, D. C.

(No Model.) 8 Sheets—Sheet 8.

W. M. MORGAN.
ELEVATED RAILWAY.

No. 419,594. Patented Jan. 14, 1890.

Witnesses

Inventor
Waitman M. Morgan
By Rich'd H. Manning Atty.

UNITED STATES PATENT OFFICE.

WAITMAN M. MORGAN, OF KANSAS CITY, MISSOURI.

ELEVATED RAILWAY.

SPECIFICATION forming part of Letters Patent No. 419,594, dated January 14, 1890.

Application filed September 7, 1888. Serial No. 284,808. (No model.)

*To all whom it may concern:*

Be it known that I, WAITMAN M. MORGAN, a citizen of the United States, residing at Kansas City, in the county of Jackson and State of Missouri, have invented certain new and useful Improvements in Elevated Railways; and I do hereby declare that the following is a full, clear, and exact description of the invention, which will enable others skilled in the art to which it appertains to make and use the same, reference being had to the accompanying drawings, forming a part of this specification.

The object of my invention is, first, in an elevated-railway system, to enable a car in transit to automatically sway and lock in travel communication with the main track a vibrating elevated switch, and in advance of an approaching car, and unlock said switch when the car has passed over and beyond the switch; second, to prevent shock to the switch mechanism in the contact of the car therewith; third, to prevent vibrating movement of a suspended car in elevated railways and relieve the track from torsional strains, and, fourth, to provide safety appliances for and prevent obstructions upon the main track of the elevated railway.

My invention consists in the novel construction and combination of parts which will first be fully described and specifically pointed out in the claims.

Figure 1:
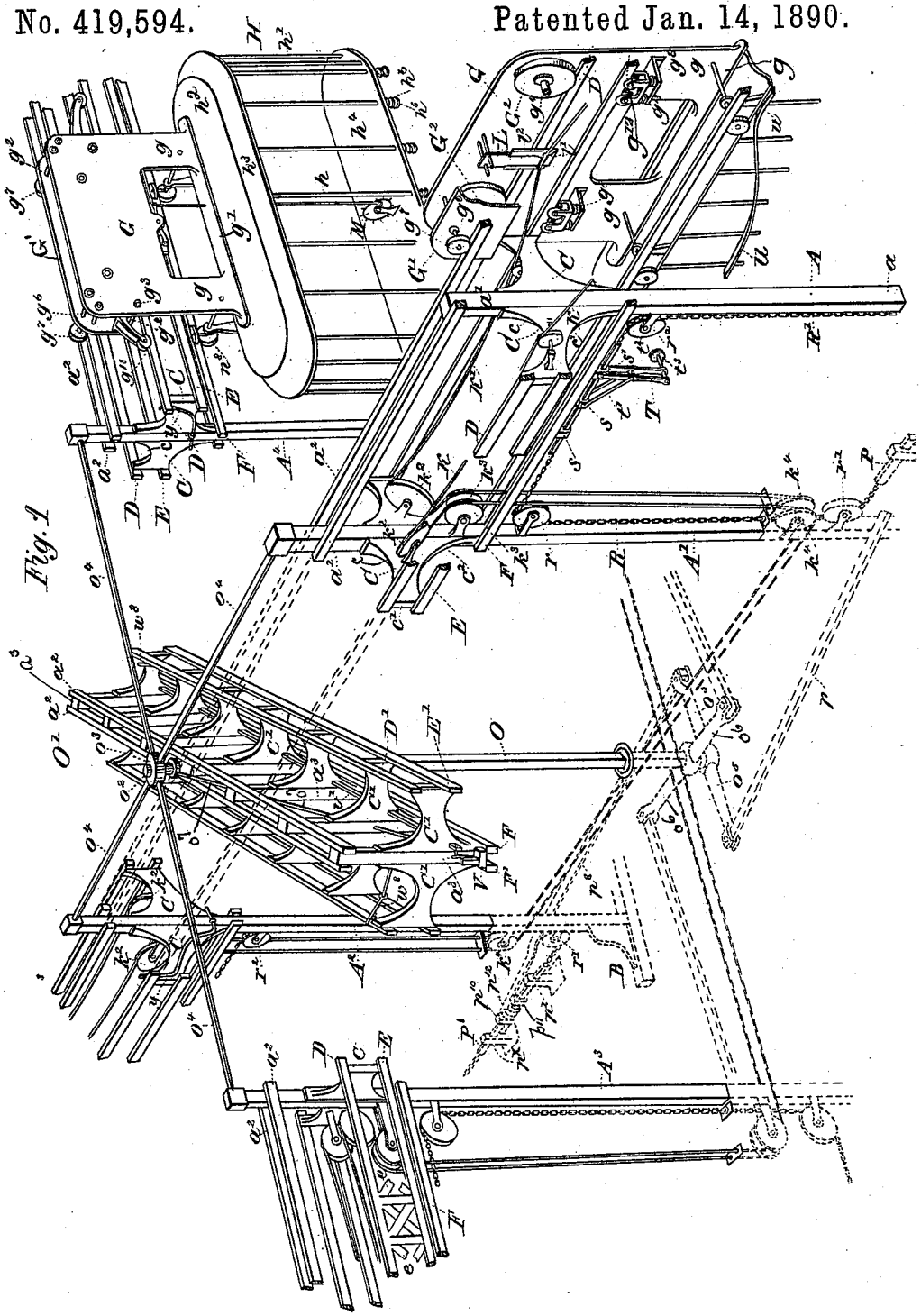
Figure 2:
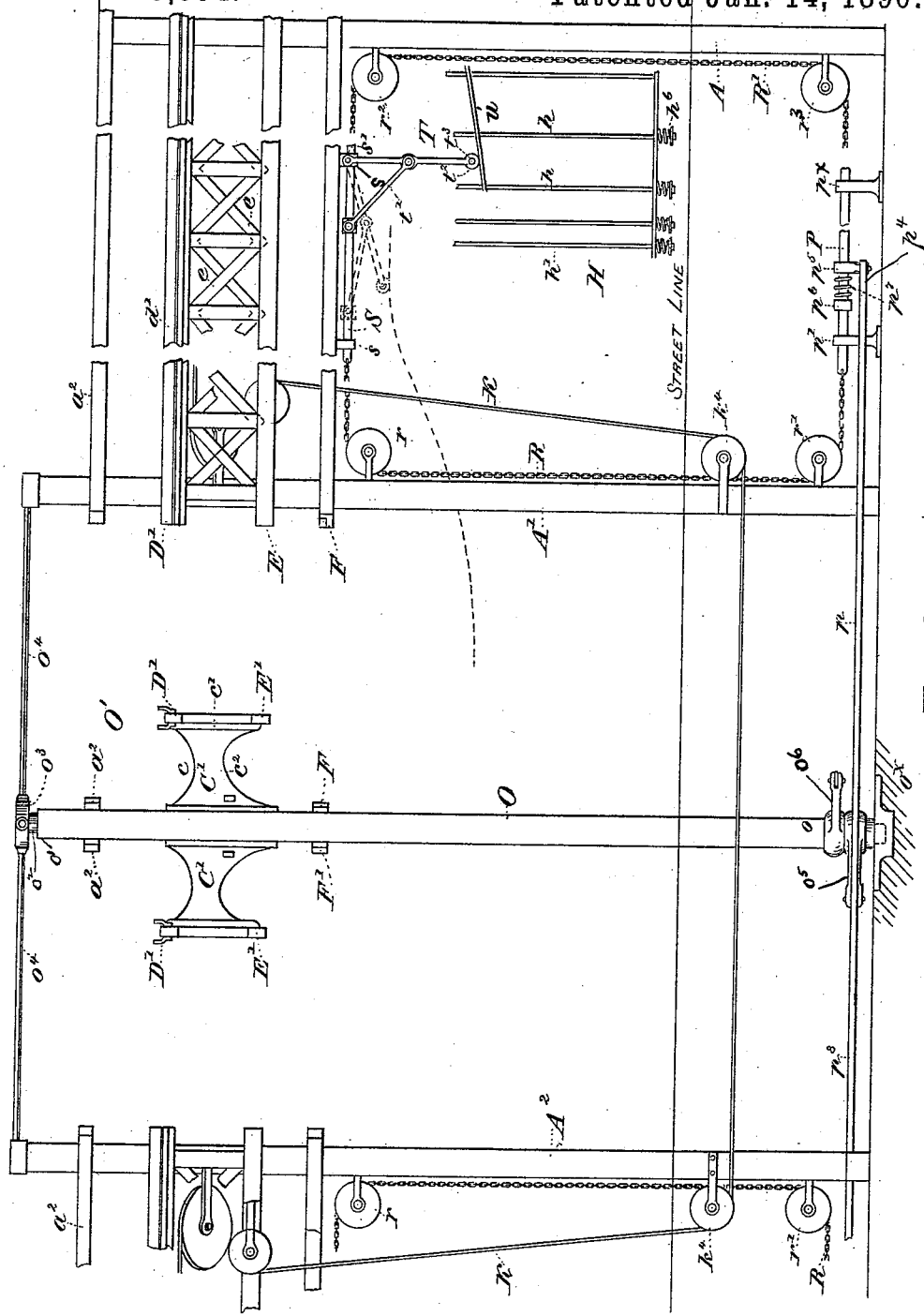
Figure 3:
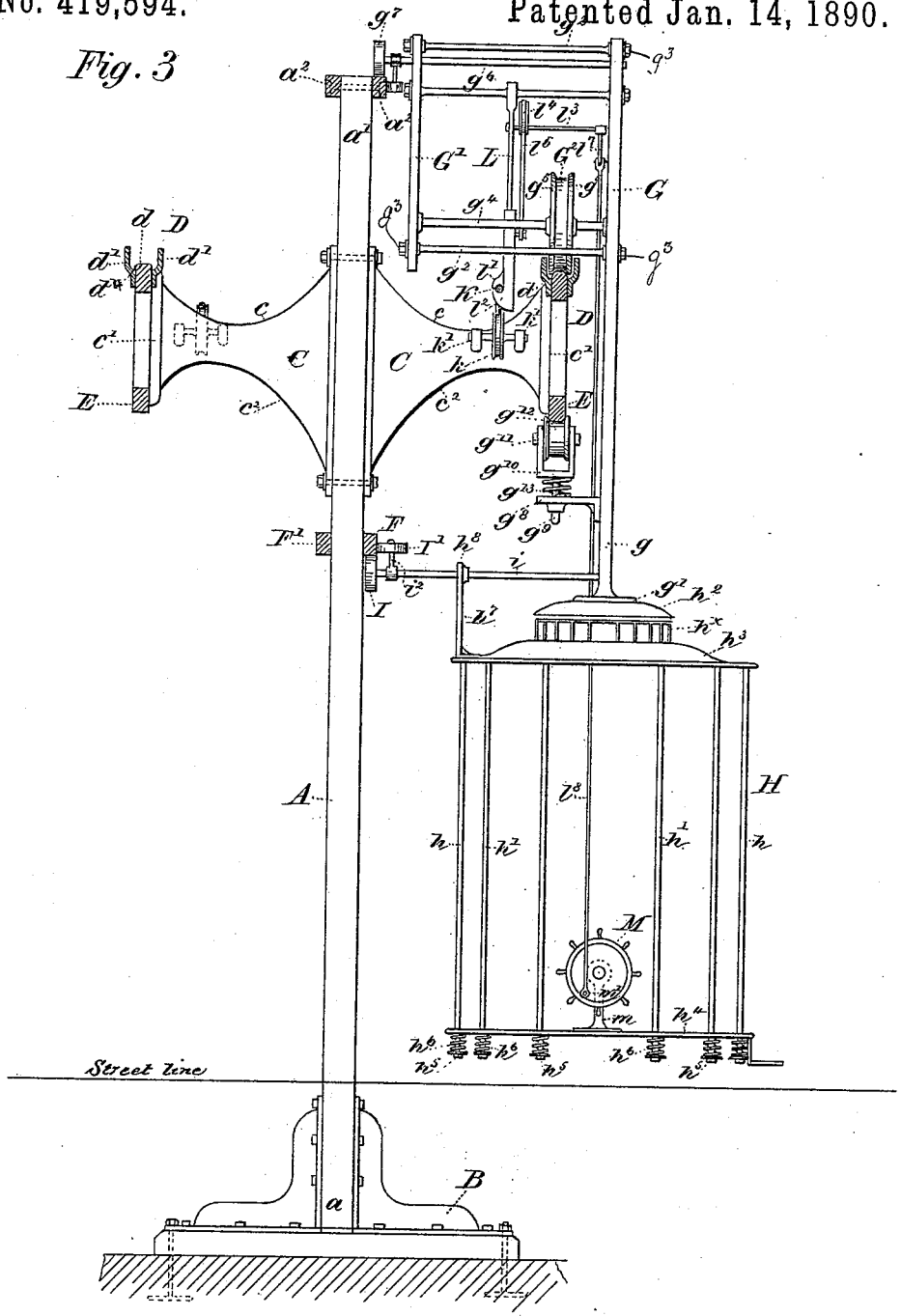
Figure 4:
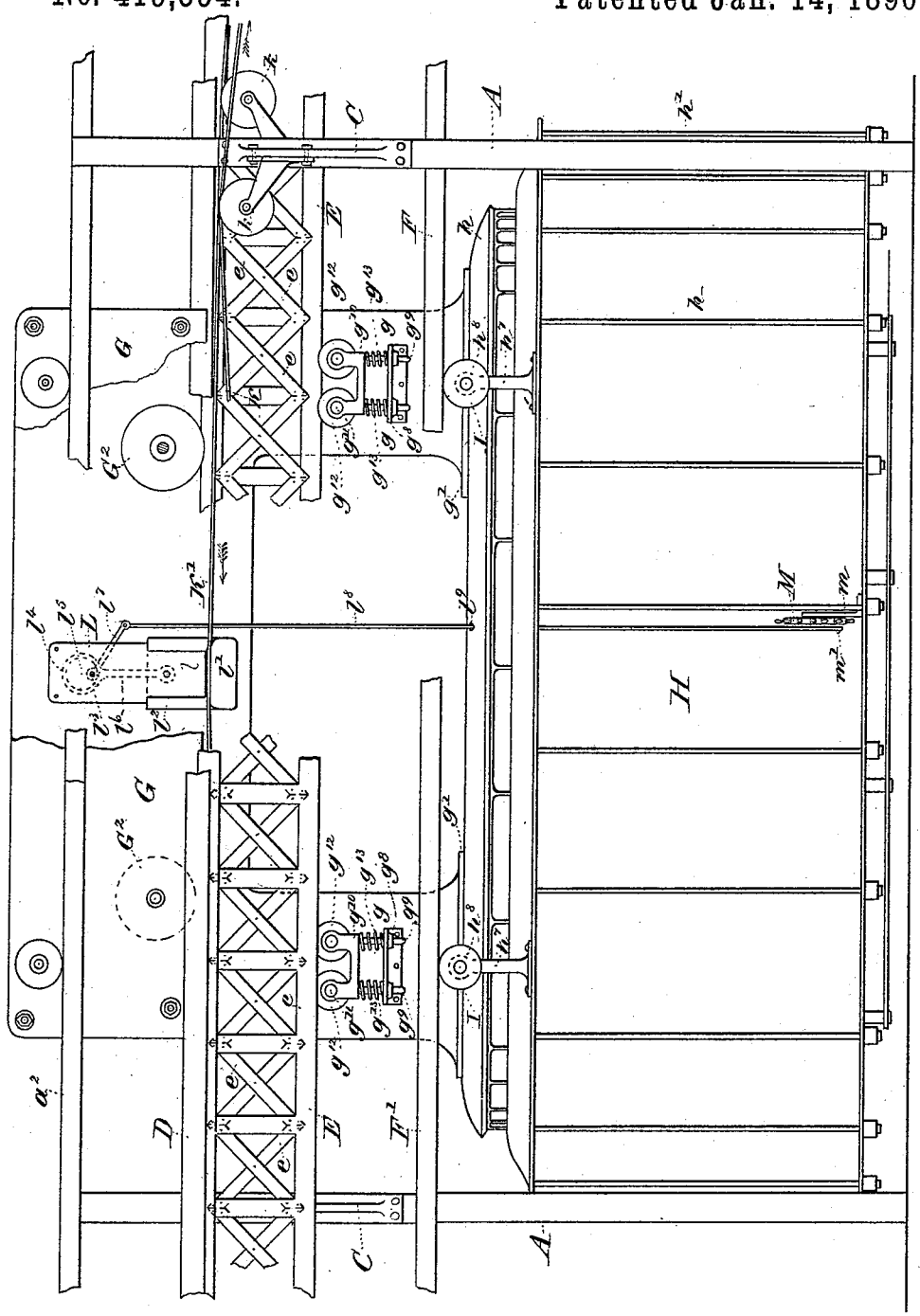
Figure 13:
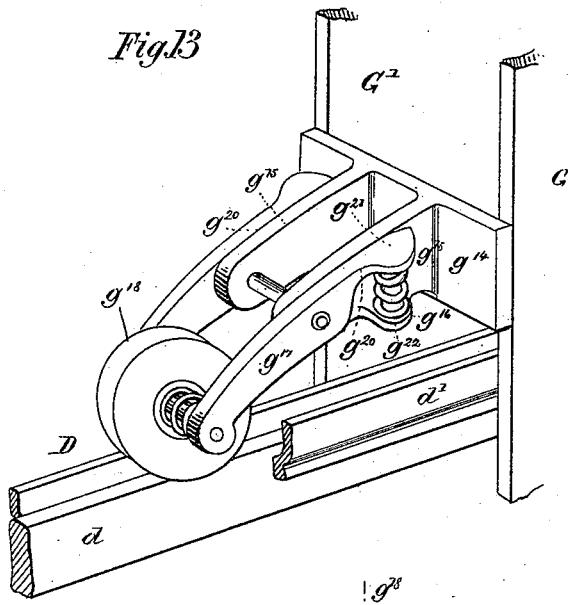
Figure 14:
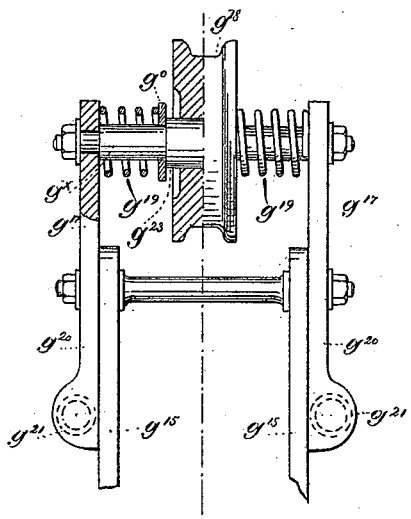

In the drawings, Figure 1 is a view in perspective of my improved double-track elevated railway, showing elevated main tracks at right angles to each other, with the cars suspended thereon and supported upon columns, and an intersecting elevated vibrating switch in track communication, and the switch mechanism beneath the surface of the ground. Fig. 2 is a longitudinal side elevation of a single main elevated main track, showing a sectional end view of the intersecting elevated vibrating switch, the underground switch mechanism, and the curved guide-track on the side of the car. Fig. 3 is an end elevation of a portion of the main elevated double track and car, showing the lateral supporting-tracks, the columns, and foundation and brackets supporting the main track. Fig. 4 is a side elevation of the main elevated track and suspended car as seen from opposite side of columns A A to its line of transit with the main track, and supporting-plates broken away to show the traveling cable and grip. Fig. 5 is a plan view of the diagonally-opposite tracks and the intersecting vibrating switch in line with and forming continuous communication at opposite ends with the main track. Fig. 6 is a plan view of the underground automatic switch mechanism operating the elevated vibrating switch. Fig. 7 is a detail side view of portions of the main track and switch on the tracks on one supporting side of a column, showing the locking-lever on the central bracket-support to the switch and the return bolt and unlocking-levers on the main track. Fig. 8 is a detail side view of the portion of the bracket-support unlocking lever and bolt, as seen in Fig. 7, showing the lever and bolt in an unlocked position. Fig. 9 is an end view of the portion of the central bracket-support at right angles to the portion as seen in Fig. 8, showing the bolt, the unlocking-lever, and the roller on its vibrating end. Fig. 10 is a detail view, in perspective, of a portion of a track-supporting bridge-column, showing the projecting notched end of the projecting end of the lower track-rail for the passage of the bolt. Fig. 11 is a detail side view of a longitudinal portion of the main-track rail, showing the outer vertical lateral flange and the longitudinal slot in said flange for the play of the unlocking-lever. Fig. 12 is a transverse sectional view of the track-rail, taken at right angles to the line $y\ y$ of Fig. 11. Fig. 13 is an end view in detail of a portion of the side supporting-plates, showing the yielding trailer-roller and a portion of the supporting-track. Fig. 14 is a view of the trailer-roller and its yielding arms, partly in plan and partly in horizontal section.

In the construction of my improved elevated railway a series of suitable vertical track-supporting stationary columns A A are erected in a single line a suitable distance apart and along the central line of a street or road, or along the curbing of the street at the sidewalk, as may be preferred, and each column is properly anchored to the ground at its lower end $a$ to foot angle-pieces B, which are laid on concrete (see Fig. 3) in such a relation underneath the street-line as to enable the greatest resistance to be sustained at their upper ends to any degree of vibration. As shown in Fig. 1, the said stationary columns A A are placed in series in one line along the central line of a street, and at the intersection of streets, where lines are seen approaching the junction of two streets at right angles to each other, the diagonal columns are slightly higher than the other columns and form stay or bridge columns $A'$ $A^2$ $A^3$ $A^4$. Said columns A A extend in height a suitable distance to support the requisite tracks and permit the intermediate suspension of a movable car from the track the proper height above the ground.

Rigidly attached to the upper end portion $a'$ of the series of stationary columns A A on opposite sides and extending from one to an adjoining column in a horizontal relation are the upper continuous guide-tracks $a^2$ $a^2$.

Upon the opposite side of each stationary column A A, and extending therefrom in opposite directions a short distance below the upper guide-track $a^2$ and in a relative horizontal relation a slight distance exceeding that of the width of the suspended car, are fixed the main-track-supporting brackets C C, which extend laterally from the opposite sides of the columns A in opposite directions to support a double track. The upper side portions of the brackets C C are cut away in a transverse curved relation to form the curved depression $c$ $c$, extending from its point of attachment to the column A to within a short distance of its opposite vertical end portion $c'$ $c'$, and the under side portions of said brackets are cut away in an upwardly-curved direction from the standards to the said vertical end portion $c'$, forming the under retreating curved portion $c^2$.

Upon the upper portion of the vertical end portions $c'$ of the brackets C C, extending in opposite directions on opposite sides of columns A, are secured at the highest point to said end portions and extending in a horizontal relation continuously from standard to standard, and attached in like manner to the end brackets upon adjoining standards, are the supporting main flanged track-rails D, which for safety are constructed as follows: Said track-rail D consists of a longitudinally-extended bar $d$, of the proper width and in thickness proportionate to the width of tread of the supporting traction-wheels of the car. Extending in the longitudinal direction of said bar $d$ and from the opposite side portion at an intermediate point between the upper and lower edges of said bar are flanges $d'$ $d'$, which are bent in a lateral direction from said sides of bar $d$, first in an outwardly-curved plane to form a depression $d^4$ to receive the flanges of a grooved wheel between said bar and flange, and thence in a vertical direction a short distance, forming a U-shaped or cup rail. (See Figs. 3 and 12.) Upon the lower portion of the vertical end portions of the brackets $c'$, and secured thereto beneath said track-rail D, is a continuous lower horizontal rail E, which extends from one column to an adjoining column in a like manner with rail D, and is similar in construction to that of the portion $d$ of the track-rail D. Between the upper and lower rails D E are the trussed supports $e$ $e$, which serve to strengthen the tracks.

Beneath the brackets C C and secured to the opposite sides of the standards A at a point beneath the lower end of the curved portion $c^2$, and extending in a like direction to that of track-rail D to an adjoining column, are continuous guide-tracks F F', similar in form to that of the portion $d$ of the track-rail D.

For the purpose of suspending a movable car in transit from the track-rails, two vertical flat suspension-plates G G', of suitable thickness, are made. The outer plate G extends upwardly a short distance above the upper guide-track $a^2$, and two separate extensions $g$ $g$ of said plate G extend downwardly from opposite end portions of said plate to a short distance below the guide-rail F, upon the lower end of which are the lateral flanges $g'$ $g'$. The opposite or inner plate G' is equal in length to that of the plate G, and is placed on the inner side of rail D a short distance from column A, and extends from a point in a horizontal relation from the upper end of plate G in a downward relation a short distance below said track-rail D. The plates G G' are retained in a fixed relation the proper distance apart by the transverse brace-bolts $g^2$ $g^2$, which extend through the upper and lower and opposite end portions of plate G', and also through the plate G, and are secured by the end nuts $g^3$ $g^3$. Extending from the lower inner side of plate G' to plate G in a transverse relation, and journaled in said sides at each respective end a short distance in from the lower brace-rods $g^2$ $g^2$, are the journals $g^4$ $g^4$, and upon said journals are fixed oppositely in line the traction and supporting flanged wheels $G^2$ $G^2$, which rest upon the main supporting track-rails D, the opposite radial flanges $g^5$ $g^5$ of which enter the depressions $d^4$ on opposite sides of the bar $d$ of track-rail D between the vertical opposite flanges $d'$ $d'$ of said rail. Between the upper brace-rods $g^2$ $g^2$, and journaled in the plate G and extending through the plate G' to a point over the upper guide-rail $a^2$ on the column A and arranged a suitable distance apart, are transverse journals $g^6$ $g^6$, upon the ends of which journals and resting upon the top of said rail are fixed opposite in line the guide-rollers $g^7$ $g^7$. Upon the inner side of the extension $g$ $g$ of the plate G, which is toward the track-rail E and a short distance relatively above guide-rail F, is attached fixedly a laterally-extended foot-plate $g^8$, which is perforated vertically at opposite ends. Through said perforations extend the lower ends of the opposite sliding rods $g^9$ $g^9$, and to their upper ends is connected a horizontal plate $g^{10}$. Extending from the opposite ends of plate $g^{10}$ in a vertical relation are forked journal-bearings $g^{11}$ $g^{11}$, arranged in a transverse relation to guide-rail E, in the upper ends of which are journaled the grooved traveling rollers $g^{12}$. Between the plates $g^8$ $g^{10}$ and around the rods $g^9$ $g^9$ are placed the spiral springs $g^{13}$ $g^{13}$, which keep the grooved rollers $g^{12}$ in contact with the under side of rail E. A suspended passenger-car H is then constructed of the proper length, the elevated top portion $h^2$ of which car H is made comparatively flat, and in length and width is proportionally smaller in dimensions than that of the body of the car between its ends and sides, and to said top portion $h^2$, at opposite ends and in a transverse central relation, are rigidly attached the flanges $g'$ of the depending portions $g$ $g$ of the movable plate G. To the elevated top portion $h^2$ are connected rods $h$ $h$, which extend downwardly a short distance and support the main portion $h^3$ of the top of the car, and which main portion is of the described length and width of said car. To the main top portion $h^3$ are connected at their upper ends the respective side and end floor-supporting rods $h$ $h'$, which are placed in line of the ends and sides of the car a suitable distance apart and extend an equal distance in a vertical relation downwardly to a point a short distance above the ground, or to the height of a car-step, the distance being increased, if preferred. To the lower end portions of the rods $h$ $h'$ is attached the bottom $h^4$ of the car, which is of the proportions of the top portion $h^3$, and which rods $h$ $h'$ pass through the said floor in the corresponding relation to their position at the top, and upon the extreme lower ends beneath said floor are screw-threaded and provided with the broad-flanged nuts $h^5$. Between the under side portion of floor $h^4$ and the nuts $h^5$ is then placed on each end of rod the spiral supporting-springs $h^6$, which construction of the car is reserved for a separate application.

To prevent lateral vibration of the car, upon the top portion $h^3$ of the car H at each end and upon the side which in transit is opposite columns A A are fixed the vertical supports $h^7$ $h^7$, which extend to a point a short distance above the horizontal flange $g'$ of the portions $g$ of plate G, and are provided with bearings $h^8$ $h^8$. In the side of the depending portions $g$ $g$ of the plate G is suitably retained one end of a horizontal fixed rod $i$, the opposite end of which extends to and beneath the track-rail F, and upon said end of rod is a rotary guide-roller I. On the said rod $i$ is attached a short distance from the track F one end of a short vertical pin $i^2$, upon the upper end of which is mounted in a horizontal relation a guide-roller I', which bears upon the side of the track F at right angles to the roller I and prevents the lateral vibrating movement of the car H.

For the purpose of operating the car I have shown the motive power transmitted through a wire cable, the opposite portions K K' of which are upon opposite sides of column A and traveling in opposite directions. Telpherage may, however, be substituted with equal facility. The cable may be made in the elevated system I, described comparatively small in diameter, as the line of draft is nearly in the line of traction of the traction-wheels.

To support the cables K K' grooved sheaves $k$ $k$ are journaled at right angles to the brackets C C' in the lugs $k'$ $k'$ on the sides of said brackets, which grooved sheaves extend a short distance above the curved depression $c$ in said brackets on each column A, and are placed in position nearer the track D than the point of attachment of the brackets to the column A. The opposite portions K K' of the cable are laid in the sheaves $k$ $k$, and extend from sheaves on one column in the series to like sheaves on adjoining column. At the intersection of streets, as seen in Fig. 1, I have designed that the cable be carried beneath the ground, and to illustrate which the columns A' A² A³ A⁴, which terminate at the intersection of cross-streets in the continuity of the main line of track, are placed a distance apart nearly equal to the distance described by the track-rails $a^2$ $a^2$ D D E E F F between one bridge-column and its adjoining column, the ends of which track-rails project beyond the bridge-column a short distance, for the purpose hereinafter described.

Upon the sides of the supporting-brackets C C on the bridge-column A' A² A³ A⁴ is attached in the path of the opposite portions K K' of the cable the opposite grooved sheaves $k^2$ $k^2$, which are inclined from the path of the cable downwardly toward each other. Upon column A', a short distance below the sheaves $k^2$ $k^2$, are attached in a vertical close relation the grooved sheaves $k^3$ $k^3$. Beneath the surface of the ground and attached to the lower end portion $a$ of column A' in a vertical line with the sheaves $k^2$ $k^2$ are attached in a vertical relation the grooved sheaves $k^4$ $k^4$. Upon the opposite bridge-columns A' A² A³ A⁴, from which the section of tracks are removed, are similarly-arranged sheaves. The cable is then passed over the sheaves $k^2$ $k^2$, thence over sheaves $k^3$ $k^3$ and over sheaves $k^4$ $k^4$ and through a suitable conduit beneath the ground at the street-crossing to the opposite standard A² in like position, thence around like sheaves $k^4$ $k^4$ on the foot of the column and upwardly around the sheaves $k^2$ $k^3$, and thence in the line of the main track extending beyond.

For the purpose of transmitting the movement of the cable to the car a gripping device is used, the detailed construction of which I have reserved as the subject-matter of another application. As shown in the drawings, two rods $g^6$ $g^6$ extend through the plates G G in close relation at a point between the opposite vertical ends and in a line with the rods $g^2$ $g^2$. To said rods, between said plates G G', is attached the upper ends of a flat plate L, which extends in a downwardly direction to a point near the plane of the traveling cable and forms the upper jaw $l'$. The movable jaw to the grip $l'$ is composed of a back sliding plate $l^2$, which overlaps upon the face of the plate L. In plate L and extending horizontally to and inside of plate G is journaled the opposite ends of a rock-shaft $l^3$. (See Fig. 3.) Around rod $l^3$ is placed a circular ring $l^4$, in which ring is retained a circular plate $l^5$, through which circular plate $l^5$ the rock-shaft $l^3$ extends eccentrically and in a transverse relation. To one side of the ring $l^4$ at one end is attached a rod $l^6$, which extends in a downward direction and is pivotally connected at its lower end to the back of plate $l^2$, (see Fig. 4,) which plate extends below the path of and lifts the cable upwardly and in contact with the upper portion or jaw $l'$ of the grip. On rock-shaft $l^3$ is attached rigidly at one end a radial lever $l^7$. To the opposite end of lever $l^7$ is attached one end of the grip-operating rod $l^8$, the opposite end of which extends downwardly through an opening $l^9$ in the top portion $h$ of the car and to a point near the center and floor of the car. Within the car H, near the rod $l^8$ upon the floor $h^4$, is a medium-height standard $m$, to the upper end of which is journaled a wheel M, and to the side portion of said wheel near the periphery is attached to pivot $m'$ the lower end of the grip-operating rod $l^8$ For the purpose of transferring the cars from one main-track line to any other main-track line radiating from the central point at any described angle the continuity of the main elevated track at the intersection of the streets is broken, and at the terminals of the track on opposite sides of the street are placed the bridge-columns A' A² A³ A⁴. The distance between the bridge-columns A' A² and A³ A⁴, which are in direct track communication, are placed a distance apart equal to that described by the tracks $a^2$ $a^2$ D D E E F F between one bridge-column and its adjoining column.

As heretofore described, a rotating shaft O is made nearly of the corresponding form and length of the bridge-columns A' A² A³ A⁴, the lower end $o$ of which shaft is pivoted and turns in a bearing $o^x$, which bearing is placed below the surface of the street and in line with the bed made for column A. The pivotal point of said bearings is arranged at a point equidistant from the bridge-columns which are in the radius of the intersecting switch with which it is desired to connect. The column O is placed in a vertical position in its bearings, and in the upper end portion $o'$ of the said column is a pivot $o^2$, which receives a cap $o^3$. In the side portion of the cap $o^3$ are inserted firmly the ends of rods $o^4$, which extend in a horizontal relation and radially to and are connected rigidly with the upper ends of the bridge-columns A' A² A³ A⁴ in the radius of the said rods $o^4$. Upon the vibrating shaft O is mounted in the horizontal plane of the diverging lines of the elevated tracks at a point equidistant between the side and end portions the switch O', which consists, first, of the brackets C' C', made of the same proportions and form as those upon column A, and attached to and extending from the opposite side of shaft O in opposite directions and arranged at a corresponding height to said side brackets on said columns A. To the shaft O, which is equal in thickness to columns A, is then attached on opposite sides at an intermediate point between opposite vibrating ends the guide-tracks $a^2$ $a^2$, which correspond in length to the distance between the terminals or broken ends of the guide-rails on the diagonally-opposite bridge-columns A' A² A³ A⁴, with which it connects at either end and in their path. Upon the shaft O, in a horizontal line with the guide-rails E F on the columns A, are placed guide-rails F F', which are similar and equal in length to the rails $a^2$ $a^2$ above on said shaft O. Attached to and between the guide-rails $a^2$ $a^2$ F F' in a vertical position on the switch to within a short distance of the vibrating end portions at opposite ends of the switch are short stay-posts $a^3$ $a^3$, and from said posts, in the direction of shaft O, are placed a suitable distance apart a series of vertical posts $a^3$, in a transverse relation to which are attached a corresponding number of brackets C' C', which brackets are attached to the sides of the posts $a^3$, extending in opposite directions and in the horizontal plane of the bracket C on the columns A. Upon the brackets C' C' of switch O', on opposite sides of posts $a^3$ and upon the upper and lower end portions of said brackets, are placed the switch portions of tracks D E, corresponding to the plane of the tracks D E on the brackets on columns A A and in length to that of the track $a^2$ of said switch. The ends of the tracks D E F F' of switch O' extend a short distance beyond the brackets C' C', which are placed near the end portion at opposite ends of said vibrating switch, and when said switch is thrown in communication with the other diverging stationary tracks, the ends of which tracks also project in a like manner, said projecting ends of the switch and stationary tracks approach relatively in close relation and against each other.

For the purpose of supporting the opposite end portions of the switch O' two truss-rods $o^7$ $o^7$ extend from the opposite sides of the vibrating shaft O, to which they are secured at one end near the guide-tracks $a^2$ $a^2$ and the opposite ends extended in opposite directions in a downward direction through the series of posts $a^3$ and attached to the lower end portions of the posts $a^3$ at relative opposite ends of the switch O'. I have shown a switch in which the tracks are in a straight line. This may be varied, however, and a curve made in the tracks of the switch to provide for any connection that may be required in the peculiar tortuous course for which an elevated road of this description is particularly adapted. Said switch O' is first vibrated to a position in line with connected stationary tracks. The ground is then excavated properly to the depth of the foundation for shaft O, and near the bottom of the excavation upon the lower end of shaft O is rigidly attached the radial crank-arms $o^5$ $o^5$, which extend in opposite directions from shaft O a short distance, and in the position of shaft O are placed nearly at an acute angle to the switch O', and also to the bridge-columns A' $A^2$ with the tracks upon which the switch is vibrated to connect. A short distance above the arms $o^5$ $o^5$, and at right angles thereto, are attached rigidly like crank-arms $o^6$ $o^6$, which, with arms $o^5$ $o^5$, are in a crossed relation to the switch O'. To the end of one of the crank-arms $o^5$, which is beneath the ends of switch O', is pivoted one end of a bar $p$, which extends longitudinally in the direction of and in the rear of the column A', with which the tracks upon the said respective end of the switch is vibrated toward and connects, and upon the bottom of the excavation made therefor in the rear of the said column A', to which the bar $p$ is directed, and in the line of the said column, is anchored in a suitable bed the opposite vertical transversely-slotted posts or bearings $p'$ $p^\times$, which extend above the plane of bar $p$. The respective opposite ends of a sliding bar P are then mounted in a horizontal relation in said bearings $p'$ $p^\times$. The opposite end of the bar $p$ to that attached to the said arm $o^5$ is bent laterally at $p^3$ in the direction of one of the bearings $p'$ nearest the column A', a short distance thence at $p^4$ in the longitudinal direction of said bar to a point intermediate between bearings $p'$ $p^\times$. On the bar P is placed a sliding lug $p^5$, to the under side portion of which is rigidly attached the portion $p^4$ of the bar $p$. On said sliding bar P, near the bearing $p'$, which is near the column A, is placed rigidly a lug $p^6$. On the bar P, beneath the lugs $p^5 p^6$, is placed a spiral spring $p^7$. In the rear of an opposing column $A^2$, the track upon which is connected in line simultaneously with column A' last referred to, are placed like bearings $p'$ $p^\times$ in a similar relation to that in rear of bridge-column A'. To the opposite crank-arm $o^5$ on shaft O, having the bar $p$, is pivotally connected at one end a bar $p^8$, which extends in the direction of the sliding bar P', and is bent at $p^9$ in the same manner as at $p^3$ on bar $p$, and the extreme ends connected to a sliding lug $p^{10}$ on bar P'. Toward the bearing $p'$, which is near the column $A^2$ for the bar P', is placed a fixed lug $p^{11}$, between which lug $p^{10}$ and the sliding lug $p^{11}$ is placed a spiral spring $p^{12}$, so that the expansion of the springs $p^7$ $p^{12}$ are in opposite directions to the shaft O. To the end of the crank-arm $o^6$ which extends over the bar $p$ is attached pivotally one end of a bar $p^{13}$, which is of a corresponding length and similarly formed as the bars $p$ $p^8$, and extends on one side of the column $A^3$ diagonally opposite column A', and to the opposite crank-arm $o^6$ is pivotally attached an arm $p^{14}$, similar in form and construction as the bars $p$ $p^8$, which arm extends toward and on the side of bridge-column $A^4$, which is diagonally opposite the column $A^2$. In the rear of the bridge-columns $A^3$ $A^4$ are placed the bearings $p'$ $p^\times$ in the same manner as described in the rear of the columns A' $A^2$, in which are similar bars P P' and sliding lugs $p^5$ $p^{10}$, in which lugs are connected the respective bars $p^{13}$ $p^{14}$ in a like manner as the bars $p$ $p^8$, and having the like springs and fixed lugs as described for said bars $p$ $p^8$. On the bridge-columns A' $A^2$ $A^3$ $A^4$ on the corresponding side having sheaves $k^2 k^2$, and toward the adjoining column A a short distance below the guide-tracks F F', are attached in a vertical relation the sheaves $r$, and upon the respective bridge-columns A' $A^2$ $A^3$ $A^4$, beneath the sheaves $k k^4$ beneath the surface of the ground, are attached the vertical sheaves $r'$. Upon columns A A, which are adjoining and in line with the bridge-columns A' $A^2$ $A^3$ $A^4$, and at a relative height to the sheaves $r$ and opposite in relation, are attached in a vertical relation the sheaves $r^2$. In a vertical line with the sheaves $r^2$ and beneath the ground, upon the same relative side of the column A as the sheaves $r^2$, and with its periphery in a line with the bars P P' in bearings $p'$ $p^\times$, is attached to the respective columns A the sheaves $r^3$. (See Fig. 2.) To the under side portion of the parallel guide-tracks E F, between the columns A and the bridge-columns A' $A^2$ $A^3$ $A^4$, are attached the depending guide-bearings $s$ $s$, which are placed a suitable distance apart and extend a short distance below said guide-track. In said guide-bearings $s$ $s$ is placed in a horizontal position a sliding rod S. (See Figs. 1 and 2.) To the end of the bar P which is directed toward the column A' is attached one end of a chain R, the opposite end of which is passed over the sheave $r'$, thence in an upward direction to and over sheave $r$, thence in a horizontal position, and connected with the end of the sliding bar S which is directed toward the column A'. To the opposite end of the bar P is then attached one end of a chain R', the opposite end of which is curved over sheave $r^3$, thence in an upward direction over sheave $r^2$, and connected to the end of the bar S opposite to that connected with chain R. In like manner upon the columns $A^2$ $A^3$ $A^4$ and their adjoining column A is attached the same sliding bar S and chains R R', which are connected to the sliding bar P P' beneath the ground, as described, between columns A' A, and therefore need no repetition.

For the purpose of operating the switch O' automatically and enabling a car upon its approach to operate the sliding bar S a comparatively long vibrating arm T is pivotally attached at one end to the side of lug $s'$, which lug, as heretofore described, is near one of the columns A, which adjoins a bridge-column $A'$ $A^2$ $A^3$ $A^4$. Upon the lower end of the arm T, extending outwardly from column A, is a rod $t^3$, upon the end of which rod is an anti-friction roller $t^2$. At a point on the arm T equidistant from opposite ends is pivotally attached one end of a short arm $t'$, the opposite end of which extends upwardly at an angle and is pivotally attached to the bar S in the direction of the column $A'$. Upon the side of the suspended car H which, when upon the elevated track, passes in close relation to the column A, as seen in the drawings, and to the rods $h$ $h$, is attached at the front end of the car, a slight distance below the point of suspension of said car on track D, as is described, on the side of said car next to the depending arm T, a laterally-extending wide track-plate U, at the front end of which said car, as it approaches a switch, is just below the position of the roller $t^2$ on the vibrating arm T, and in the path of the roller $t^2$. The said track-plate U extends in a gradual curved ascending plane from said end of car to the opposite end, at which point $u$ the plate U is quite near the top portion $h^3$ of the car, and from which point the track-plate is bent in a horizontal plane.

For the purpose of locking the tracks $a^2$ $D'$ $E'$ $F'$ on the switch $O'$ with the tracks on the bridge-columns $A'$ $A^2$ $A^3$ $A^4$ in the radius of the shaft O, and with which the said switch is thrown in line by the approaching car, and unlocking the same in the passing of the car, a portion of the upper side and end of the projecting end of the guide-rail F on the bridge-columns $A'$ $A^2$ $A^3$ $A^4$, which is first approached in the vibration of the end of the switch, is cut away in a transverse relation nearly one-half its width, forming a notch $f'$. (See Fig. 10.) Upon the end of the switch $O'$ and a short distance above the projecting end portion of the guide-rail F, which is swung into a position opposite the track-rail F on the bridge-columns $A'$ $A^2$ $A^3$ $A^4$, having the notch $f'$, is attached a narrow flat strip $v$, which extends from the post $a^3$ beyond the extended ends of the said guide-rail F a certain distance, corresponding to the length of the notch $f$ in the guide-rail F on the bridge-columns $A'$ $A^2$ $A^3$ $A^4$. A short distance laterally toward a vertical central line on post $a^3$ from the said strip $v$ is attached to posts $a^3$ in the same relation a strip $v'$. Between the strips $v$ $v'$, and attached in line with the lower horizontal edges of said strips and extending from the post $a^3$ to a point in a vertical line with the extreme ends of the guide-rail F, is a strip $v^2$. Detached transversely to the strips $v$ $v'$, and extending also to the guide-rail $F'$, is a face-strip $v^3$. Between the strips $v$ $v'$ $v^2$ $v^3$, and formed thereby, is a rectangular vertical opening $v^4$. A bolt V is then made of the proper width to fit the opening $v^4$, and in length approximately one-third of that of the post $a^3$. On the side of bolt V which, when placed in the slot $v$, is opposite the post $a^3$ is made a longitudinal groove $v^5$, which extends from its upper end toward its lower end a distance two-thirds of its length. In the groove $v^5$, a short distance above the portion of the bolt below the end of the said groove, is placed in a transverse relation a pin $v^6$. To and between the opposite strips $v$ $v'$, near the post $a^3$, is attached the lower end of a vibrating lever W, and integral with said pivoted end of lever W is attached one end of an arm $w'$, the outer end of which arm extends to a point within the groove $v^5$ of the bolt V and beneath the pin $v$. The upper end portion of the lever W is provided with the forked portions $w^2$ $w^2$. A lever $W'$ is then made, consisting of a bar which extends through the side portion of the brackets $C'$ on the switch $O'$ on the side of the post $a^3$ laterally from the lever W. Upon one end of the lever $W'$ is attached at right angles the end of a bolt $w^3$, the opposite end of which is provided with a neck $w^4$, which receives the forked ends $w^2$ $w^2$ of the vertical lever W. Upon the post $a^3$ upon the opposite end of the switch $O'$ and extending from the inner side of said post in a horizontal direction is attached a support $w^5$. (See Fig. 7.) Through said support $w^5$ in a transverse relation is extended a shaft $w^6$, upon one end of which is a crank $w^7$. The opposite end of the lever $W'$ to that attached to lever W is then attached pivotally to the end of the crank $w^7$. The crank $w^7$ and the lever W are then thrown in an inclined position toward the end of the switch having bolt V, and in this position the lower end of a vertical lever $w^8$ is attached to the opposite end of shaft $w^6$ to that having the crank $w^7$. In the flanged portion $d'$ of the main track D, in a vertical line with the outer side portion $d$ of said track, which is over the lever $w^8$, is made a longitudinal slot $w^9$, which extends within the radius of the lever $w^8$, and through which slot is extended the upper end of the operating-lever $w^8$, against which the flanges of a car-wheel strike in transit, and the ends of the slot limited in distance, so as to retain the end of the lever therein. Upon the bridge-column $A'$ $A^2$ $A^3$ $A^4$, and upon the side portion opposite the lever W, and at a point on said column above the height of bolt V when elevated, is pivotally attached the lower end of a lever Y, and at the pivoted point of said lever, and extending upwardly at a slight angle to said lever, and integral therewith, is a short arm $y$, which extends to a point over the said bolt V when the switch $O'$ is thrown in communication with the tracks on the bridge-columns. On the side of the column $A'$ is attached one end of a spiral spring $y'$, the opposite end of which is attached to the lever Y. In the track D above the lever Y and in the flange portion $d'$ of said track D is made a longitudinal slot $y^2$, which is in a vertical line with the outer side of the portion $d$ of said track, through which slot $y^2$ is extended the upper end of the lever Y, and, as is the case with the lever $w^8$ in the switch O', is struck by the flanges on the traction-wheels $G^2$ of the car in transit.

I have described the means for locking and unlocking the vibrating switch with the stationary tracks on one side of the post $a^3$ of the switch and the column A. Upon the opposite sides of the post $a^3$, beneath an opposite track at an opposite end of the switch to that provided with the bolt V, is a similar bolt V', which is operated by similarly constructed and arranged levers, as heretofore described, and is a repetition, the main results being that the switch being locked as the car approaches and enters the switch the switch is unlocked as the car passes from the switch.

In order to guide the plates G G', which support the car upon the track D in describing curves in the track, and also to enable the traction-wheels to be grouped close together, a cross-bar $g^{14}$ is attached in a transverse relation to the opposite ends of the plates G G' at a point midway between the upper end portion of the plates G G' and the track-rail D. Upon the outer side portions of the plate is attached two parallel downwardly-curved arms $g^{15}$ $g^{15}$, which are a short distance apart and extend part way toward the track D. Upon the lower outer side portion of the arms $g^{15}$ is attached a flange $g^{16}$. Pivotally attached to the arms $g^{15}$ on outer opposite sides are the curved extensions of $g^{17}$ $g^{17}$, upon the lower ends of which arms in a transverse relation is pivoted on the rod $g^\times$ the laterally-moving ground-roller $g^{18}$, from opposite sides of which extends a short distance a concentric flange $g^{23}$. On the rod $g^\times$ on opposite sides of the flange $g^{23}$ is placed the laterally-sliding disks $g^o$ $g^o$, which bear against said flanges $g^{23}$. Extending around rod $g^\times$ and against the disks $g^{23}$ $g^{23}$ on opposite sides of the roller $g^{18}$ is placed the spiral springs $g^{19}$ $g^{19}$. From the pivoted point of the curved extension $g^{17}$ of arms $g^{15}$, and from said arms in the direction of the plate $g^{14}$ in the line of the curve of the arm $g^{15}$ to a point over the flange $g^{16}$, is extended a curved portion $g^{20}$ $g^{20}$ of said arms, upon the extreme end of which is a wide flat portion $g^{21}$ $g^{21}$, between which portions $g^{21}$ and the flange $g^{16}$ is placed a spiral spring $g^{22}$, so that the roller $g^{18}$ is permitted a yielding movement laterally on rod $g^\times$, and also in a vertical direction on the pivots of said arms.

In the operation of the elevated road as herein constructed the car H, mounted on the single track-rail D, which constitutes its track on one side of column A and its lateral vibration, counteracted by the upper and lower distant guide-bearings $g^7$ I I', and suspended above the ground, is advanced upon the track in the position shown in Fig. 1, the end of the car presenting the guide-track U at the lowest point of inclination, being denominated the "front end." The cable, in power-connection with the engine traveling in the direction of the arrows, is then, with its portion K', in the path of the jaws of the grip. The wheel M on the car is then given a half-rotation, which depresses the end of the lever $l^7$, and the eccentric $l^5$ then acts to elevate the lower grip-jaw $l'$, the cable K is thrown up against the plate L, and the car moves with the speed of the cable. Upon the approach of the car toward the switch the roller $t'$ on the vibrating lever T meets the inclined portion of the track U on the side of the car, and, meeting with the resistance of the track in its upward inclination, the roller is thrown in an upward direction. The lever $t'$ on lever T throws the bar S toward the bridge-column, which draws upon the chain R', and also moves the bar P beneath the ground in an opposite direction to which the bar S is moved, and also the bar P' in rear of the opposite bridge-column $A^2$. Bar $p$, connected with bar P, then draws upon the crank $o^5$ in shaft O, the spring $p^{12}$ on bar P' is compressed, and the said shaft and the end of the switch O' vibrated to and in travel communication with the main track upon which the car H is mounted. As the end tracks D F F' are brought together the raised bolt V passes the notch $f'$ in the rail F on the bridge-column to a position between said ends of guide-tracks F F', which form a keeper for the bolt V. The position of the advanced trailer-roller $g^{18}$, then in contact with the lever Y, is at the end of the main track and the lever T, which controls the switch, being upon the guide-track U and near its horizontal portion $u$, the switch remains in a closed position until vibrated by a car approaching in another direction. The advanced trailer-roller $g^{18}$ of the car then strikes the upper vibrating end of the lever Y and the arm $y$ is thrown down upon the bolt V and the switch is locked with the main track. The car H then enters the switch and passes to a point at the opposite end of said switch, upon which is the lever $w^8$. The advanced trailer-roller $g^{18}$ then meets the end of said lever $w^8$, in line therewith on the track, and yields in an upward direction and passes over the said end of the lever without operating it and enters the main stationary track in line with said switch, thus preventing the turning of the switch and the consequent derailment of the car when lever $w^8$ shall have been acted on by the carrying-wheels of the car, which movement brings the flange of the advanced traction-wheel $G^2$, which supports the car in transit, sharply against the end of said lever $w^8$, which is also in the path of the flange of the wheels $G^2$ $G^2$, and the momentum and weight of the said wheels, acting upon the lever $w^8$ successively, then depress said lever $w^8$, which elevates the bolt V, and said bolt remains in that position until the succeeding car operates to lock the same in the manner described. The action of the spring $p^{12}$ on the bar P' in rear of bridge-column $A^2$, beneath the ground, is to prevent shock to the switch O' when the car strikes the vibrating arm T to operate the switch.

By the use of the trailer-rollers $g^{18}$, which are placed at opposite ends of the plates G G' and in opposite directions, I am enabled to throw the traction-rollers $G^2$ $G^2$ closer together, and thus effect in a curved track less resistance in the passage of the car. In describing curves in the track the roller $g^{18}$ in advance of a traction-wheel $G^2$ yields laterally and meets with slight resistance, and in keeping in the plane of the curve the combined advanced and retreating rollers $g^{18}$ $g^{18}$ assist to sway the plates G G', and consequently change the angle of the traction-roller $G^2$ $G^2$ in the direction of the curve. When obstructions are met with on the track, the guide-rollers $g^{18}$ yield vertically and pass over the obstruction and retain their position upon the track, and thus prevent derailment of the car. It will be seen that the return-transit of a car is upon the opposite side of the series of supporting-columns, past which it is carried in the direction of the moving cable, and upon approaching a terminus of the line the cars H are thrown upon a switch (not shown in this application, which, however, is similar to the switch O', the details being reserved for another application) and the car turned around and transferred upon an opposite track in line with the return-cable K.

For the purpose of this invention the shaft O may be disconnected from the operating bars and chains and may be rotated in any suitable manner, so as to transfer the car from one to an opposite track upon the main line, where a short line is constructed and the switch not required.

The elevated road thus constructed permits the columns to be placed long distances apart, and thus presenting few obstructions to vehicles. The windage which results from the friction of the air between the bottom of a car and the ground in the rapid transit of ordinary surface roads and retards their speed is avoided, and in the propulsion of the elevated car the evenness of the track prevents recoil, and consequently the strain upon the car-frame is reduced to its minimum.

Having fully described my invention, what I now claim as new, and desire to secure by Letters Patent, is—

1. In a railway system of diverging tracks, the combination of a main track and a car thereon, an intersecting vibrating switch adapted to connect with the said main track, a switch-closing lever connected with said switch and extending to said main track, and a vibrating lever connected with said switch-closing lever on the main track and in the path of and contacting with said car, substantially as and for the purpose described.

2. In a railway system of diverging tracks, the combination of a main track and a car thereon, an intersecting combined vibrating switch and its supporting-shaft adapted to connect with the said main track, radius-arms on the said vibrating shaft, and alternately contracting and expanding springs in suitable bearings connected with said radial arms on said shaft, for the purpose described.

3. In a railway system of diverging tracks, the combination of a main track and a car thereon, an intersecting vibrating switch and its combined supporting-shaft adapted to connect with the said main track, radius-arms on the said vibrating shaft, springs in suitable bearings connected with said radius-arms, a switch-closing lever connected with said switch and extending to the said main track, and a vibrating lever connected with said switch-closing lever on the said main track and in the path of and contacting with said car, as and for the purpose described.

4. In a railway system of diverging tracks, the combination of a main track having stationary track-supports and a car thereon, an intersecting elevated vibrating switch and its combined supporting-shaft adapted to connect with the said main track and radius-arms on said vibrating shaft, horizontal oppositely-sliding upper and lower bars in fixed bearings upon the ground and also upon the said elevated tracks, springs on said lower bar suitably connected with said radius-arms on said shaft, sheaves on said track-supports and also in the line of said sliding bars, chains extending over said sheaves and connected, respectively, at opposite ends to the opposite ends of the said sliding bars, and a vibrating lever pivotally connected to one of said main tracks at a suitable distance from its end, and also pivotally connected with the sliding bar on said track and arranged in the path of and adapted to contact with the moving car, substantially as shown and described.

5. In railways, the combination, with the main track having a bolt-keeper, of an intersecting vibrating switch, a normally-elevated bolt at one end of said switch adapted to interlock with the keeper on said main track, and a spring-retracted depressing-lever on said track, having an arm in the path of said bolt, for the purpose described.

6. In railways, the combination, with the main track and its supports provided with a bolt-keeper, of an intersecting vibrating switch, a normally-elevated bolt on one end of said switch adapted to interlock with said keeper, a vibrating lever on the opposite end of said switch in the line of said track, an elevating-lever on said switch connected with said bolt, and a bar connecting said vibrating lever with said elevating-lever, substantially as and for the purpose described.

7. In railways, the combination, with the main track and its supports provided with a bolt-keeper, of an intersecting vibrating switch, a normally-elevated bolt on one end of said switch adapted to interlock with said keeper, a vibrating lever on the opposite end of said switch in the line of said track, an elevating-lever on said switch connected with said bolt, a bar connecting said vibrating lever with said elevating-lever, and a spring-retracted lever on said main-track support, having an arm in the path of said bolt on said switch, substantially as and for the purpose described.

8. In elevated railways, the combination of the main elevated track and its supports provided with a bolt-keeper and a car having traction-wheels, an intersecting elevated vibrating switch having its shaft provided with radial arms at its lower end, horizontal oppositely-sliding upper and lower bars in suitable bearings upon the ground and also upon the said main-track supports, and alternately contracting and expanding springs on said lower bars suitably connected with said radial arms, sheaves on said main-track supports on the line of said sliding bars, chains extending over said sheaves and connected, respectively, at opposite ends to the opposite ends of said upper and lower sliding bars, a normally-elevated bolt on one end of said switch adapted to interlock with the keeper on said main-track support, an elevating-lever on said switch connected with said bolt, a vibrating lever on the opposite end of said switch in the line of the main track adapted to contact with the car, and a bar connected with said vibrating lever and also with said bolt-elevating lever, a spring-retracted vibrating lever on said main-track support adapted to contact with said car, having an arm in the path of said bolt, and a vibrating lever pivotally connected with said sliding bar on said main-track support and also with said support, as and for the purpose specified.

9. In elevated railways having supporting-columns and lateral track-supporting brackets, the combination, with a horizontal main-track rail and a horizontal guide-rail in a vertical relation to said main-track rail, of an opposite vertical car-supporting movable plate on the outer sides of said track-rails, traction-wheels bearing on said main-track rail pivoted to said movable plate, suitable bearings on said movable plate beneath said guide-track rail, and yielding rollers on said bearings in rolling contact with the under portion of said guide-rail, for the purpose described.

10. In railways, the combination of an elevated main track and its supports, rigidly-connected plates having traction-wheels on said main track, a guide-track on the track-supports in the line of the main track, and a car suspended from and connected with said plates, provided with suitable lateral guide-bearings and rollers extending to said guide-track, for the purpose described.

11. In railways, the combination of an elevated main track having supporting-columns extending above the plane of said track, guide-tracks in the line of and above and below said main track, rigidly-connected plates having traction-wheels on said main track, and rods connected with said plates extending in the direction of said guide-rails, having anti-friction guide-rollers thereon, for the purpose specified.

12. In elevated railways having supporting-columns and lateral track-supporting brackets and a track thereon, the combination, with said track, of a suitable movable truck-frame, adapted to support a car, traction-rollers journaled on and supporting said frame upon said track, vertically-yielding arms extending from said frame in the direction of said track, and flanged rollers on said track in advance of said frame between said extended arms, for the purpose described.

13. In elevated railways having supporting-columns and lateral track-suspending brackets, and a track thereon, the combination, with said track, of suitable movable plates on opposite sides of said track adapted to support a car, traction-rollers journaled in and supporting said frame upon said track, vertically-yielding arms connected with at one end and extending from the ends of said frame in the direction of said track, a transverse rod connecting the opposite ends of said arms, a laterally-moving flanged wheel on said rod, and springs on the said rod on opposite sides of said roller, for the purpose described.

14. In an elevated railway, the combination, with the supporting-columns and the lateral track-supporting brackets and a horizontal main-track rail thereon, and horizontal guide-tracks on said columns above and below said main-track rail, of movable plates on the inner and outer sides of said main-track rail, vertical depending extensions of said outer plates, a vehicle having its top portion connected with said extension guide-rods extending in a transverse relation through the upper portion of said plates above and in the direction of said guide-tracks provided with guide-rollers, suitable bearings on the top of said car toward said columns, horizontal guide-rods connected with said extensions of said plates and extending through said bearings on said car and to and beneath said lower guide-rail, a vertical guide-roller on the outer end of said rod bearing against said guide-rail, a vertical pin on said rod in close relation to said guide-rail, and a horizontal guide-roller on said pin at right angles to said roller on said rod, for the purpose described.

15. In elevated railways, the combination of a main track and an intersecting vibrating switch adapted to connect with the said main track, a switch-closing lever connected with said switch and extending to said main track, a vibrating lever on said main track connected with said switch-closing lever, rigidly-connected truck-plates having traction-wheels on said main-track, and a car attached to and suspended from said plates provided with an inclined guide-track in the path of said vibrating lever, substantially as and for the purpose described.

16. In elevated railways, the combination of a main track and an intersecting vibrating switch adapted to connect with the said main track, a switch-closing lever connected with said switch and extending to said main track, a depending vibrating lever on said main track connected with said switch-closing lever, rigidly-connected plates on said main track having traction-wheels, and a vehicle attached to and suspended from said plates provided with a track upon its side extending in an upwardly-inclined direction to a point near the top of said vehicle and in the path of and adapted to contact with said vibrating lever, as and for the purpose specified.

WAITMAN M. MORGAN.

Witnesses:
S. L. C. HASSON,
STUART CORKENER.